United States Patent [19]
Preikschat et al.

[11] Patent Number: 4,818,099
[45] Date of Patent: Apr. 4, 1989

[54] OPTICAL RADAR SYSTEM

[76] Inventors: Fritz K. Preikschat, 16020 Lake Hills Blvd., Bellevue, Wash. 98008; Ekhard Preikschat, 9048 NE. 41st St., Bellevue, Wash. 98004

[21] Appl. No.: 791,580

[22] Filed: Oct. 25, 1985

[51] Int. Cl.$^4$ .............................................. G01C 3/08
[52] U.S. Cl. .......................................... 356/5; 372/36; 357/74; 357/81
[58] Field of Search .................. 372/9, 36, 43, 75; 356/4, 5; 357/74, 76, 81; 331/94.5

[56] References Cited

U.S. PATENT DOCUMENTS

| | | | |
|---|---|---|---|
| 3,360,987 | 1/1968 | Flower et al. | 73/71.3 |
| 3,402,630 | 9/1968 | Blau et al. | 88/1 |
| 3,479,528 | 11/1969 | Fisher | 307/231 |
| 3,530,468 | 9/1970 | Hannan | 343/15 |
| 3,648,073 | 3/1972 | Sams et al. | 307/246 |
| 3,676,003 | 7/1972 | Naiman et al. | 356/5 |
| 3,737,231 | 6/1973 | Low et al. | 356/5 |
| 3,749,197 | 7/1973 | Deutsch | 180/98 |
| 3,771,031 | 11/1973 | Kay | 317/235 |
| 3,790,278 | 2/1974 | Buczek et al. | 356/28 |
| 3,815,994 | 6/1974 | Peckham | 356/4 |
| 3,825,341 | 7/1974 | Goto | 356/28 |
| 3,840,754 | 10/1974 | Okada et al. | 307/257 |
| 3,860,343 | 1/1975 | Janney et al. | 356/28 |
| 3,897,150 | 7/1975 | Bridges et al. | 356/5 |
| 3,940,696 | 2/1976 | Nagy | 325/141 |
| 3,951,549 | 4/1976 | Fowler et al. | 356/5 |
| 3,997,843 | 12/1976 | Wohlers | 325/105 |
| 4,009,960 | 3/1977 | Feldman et al. | 356/1 |
| 4,011,445 | 3/1977 | O'Meara | 250/199 |
| 4,068,953 | 1/1978 | Harney et al. | 356/75 |
| 4,077,718 | 3/1978 | Graham, Jr. et al. | 356/4 |
| 4,092,614 | 5/1978 | Sakuma et al. | 331/94.5 |
| 4,109,217 | 8/1978 | Brackett et al. | 331/94.5 |
| 4,209,253 | 6/1980 | Hughes | 356/152 |
| 4,298,280 | 11/1981 | Harney | 356/5 |
| 4,323,798 | 4/1982 | Watkins | 307/491 |
| 4,351,051 | 9/1982 | van Alem et al. | 372/36 |
| 4,370,572 | 1/1983 | Cosand et al. | 307/353 |
| 4,388,633 | 6/1983 | Vasudev | 357/17 |
| 4,399,413 | 8/1983 | Bosselaers | 328/151 |
| 4,400,633 | 8/1983 | Mouri | 307/351 |
| 4,439,910 | 4/1984 | Vasudev | 29/569 |
| 4,441,186 | 4/1984 | Erickson | 372/19 |

Primary Examiner—M. H. Paschall
Attorney, Agent, or Firm—Christensen, O'Connor, Johnson & Kindness

[57] ABSTRACT

An optical radar system comprising a transmitter (20), a receiver (22), a signal processor (200) and means (202, 206) for conveying a return signal from the receiver to the signal processor. The transmitter comprises a laser diode (50), an avalanche transistor (52), a capacitor (56) and a trigger generator (58). The laser diode, avalanche transistor and capacitor are arranged so as to minimize the combined effects of self-inductance and stray capacitance, thereby enhancing the speed and power of the optical pulses. The receiver comprises a reverse biased photodiode capacitively coupled to a dual gate GaAs-FET. The transmitter and reciever are connected to the signal processor via coaxial cable (206) and cable amplifiers (202). The cable amplifiers are selected to compensate for the high frequency attenuation of the coaxial cable, such that the combined cable/cable amplifier transmission system has an essentially flat frequency response up to 1000 MHz.

10 Claims, 7 Drawing Sheets

OPTICAL RADAR SYSTEM

FIELD OF THE INVENTION

The present invention relates to an optical radar system, i.e., a system for determining the range or other characteristics of a target by illuminating the target with a light beam and detecting the target reflection.

BACKGROUND OF THE INVENTION

Optical radar systems have come into use over the last twenty years, largely in response to the availability of pulsed, high-powered light sources such as YAG lasers. Such systems have operated by generating a single pulse, or have been modulated at a few pulses per second. The low pulse repetition rate of such lasers, together with the size, cost and bulk of YAG lasers, have limited such radar systems to various specialized applications.

SUMMARY OF THE INVENTION

The present invention provides an optical radar system that includes a number of innovative features that serve to overcome limitations of prior optical radar systems, and make the present radar system suitable for a much wider range of applications than prior optical systems.

In one aspect, the optical radar system of the present invention comprises a transmitter, a receiver, a signal processor, and means for conveying a return signal from the receiver to the signal processor. In a preferred embodiment, the transmitter comprises a metallic heat sink including a base and a pedestal upstanding from the base, a laser diode mounted to the pedestal, a capacitor positioned adjacent the pedestal and an avalanche transistor. The laser diode has first and second terminals and has its first terminal electrically connected to the pedestal. The capacitor comprises first and second plates, the first plate being connected to the heat sink. The collector of the avalanche transistor is connected to the second plate, and the emitter of the avalanche transistor is connected to the second terminal of the laser diode. Means are provided for supplying a trigger signal to the base of the avalanche transistor, and for charging the second plate.

In another embodiment, the transmitter comprises circuit board means having a conductive strap defining a ground plane on one surface, a laser diode, a capacitor, and an avalanche transistor. The laser diode has first and second terminals and is mounted within a metallic case, the first terminal being electrically connected to the case. The second terminal of the laser diode is connected to a conductive pin that extends from the case. The laser diode is mounted to said one surface of the circuit board with the pin extending through the circuit board to the opposite surface thereof. The capacitor comprises first and second plates, the capacitor being substantially mounted within a cutaway portion of the circuitboard. The first plate is positioned adjacent said one surface and electrically connected to the conductive strap. The avalanche transistor is mounted adjacent the opposite surface of the circuit board. The collector of the avalanche transistor is electrically connected to the second plate of the capacitor, and the emitter of the avalanche transistor is electrically connected to the conductive pin.

In a preferred embodiment, the receiver of the optical radar system of the present invention comprises a reversed biased photodiode coupled through a capacitor to a preamplifier. The preamplifier comprises a gallium arsenide field effect transistor having two gate terminals, a source terminal and a drain terminal. One gate terminal and the source terminal are grounded, the other gate terminal is connected to receive the signal from the photodiode, and the output of the preamplifier is taken at the drain terminal. An inductor may be connected between the capacitor and the first gate terminal to compensate for the input capacitance of the field effect transistor.

In another aspect, the optical radar system of the present invention comprises a transmitter for generating pulses of optical radiation, a receiver for receiving optical radiation reflected from a target and for producing a corresponding electrical return signal, a signal processor, a coaxial cable and one or more cable amplifiers. The coaxial cable comprises a signal line and a grounded shield, one end of the coaxial cable being connected to the receiver such that the signal line is connected to receive the electrical return signal, the other end of the coaxial cable being connected to the signal processor. The cable amplifier is connected in line with the coaxial cable, and the frequency versus gain characteristics of the cable amplifier are selected to compensate for the signal attenuation caused by the coaxial cable. The cable amplifier may comprise an even number of amplification stages interconnected to highpass T filters, and the compensation provided by the cable amplifiers preferably produces an essentially flat frequency versus gain characteristic up to 1000 MHz.

DETAILED DESCRIPTION OF THE INVENTION

Figure 1:
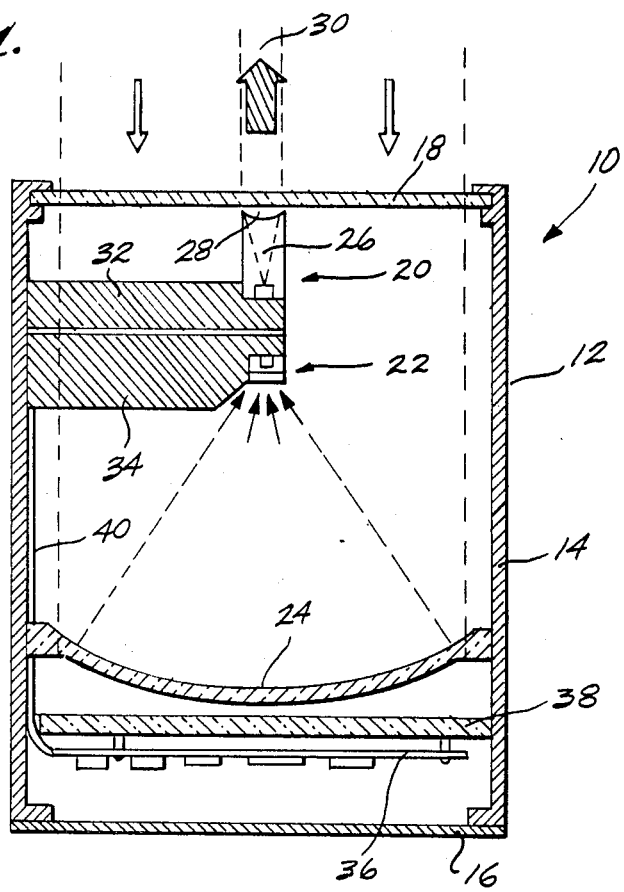
FIG. 1 is a cross-sectional view of a transceiver for the optical radar system of the present invention.

FIG. 1 illustrates one preferred embodiment of transceiver 10 for use in the optical radar system of the present invention. The transceiver includes cylindrical enclosure 12 consisting of side wall 14 and bottom wall 16. Bottom wall 16 may be made removable to provide access to the interior components. The front end of enclosure 12 comprises window 18 that is essentially transparent to optical radiation but that protects the system from the environment. The terms "light" and "optical" are used herein to refer to electromagnetic radiation having a wavelength in the infrared, visible or ultraviolet ranges. Mounted within enclosure 12 are transmitter 20, receiver 22 and parabolic mirror 24. Transmitter 20, described in detail below, generates pulsed laser beam 26 that passes through collimating lens 28 to produce collimated beam 30 that is directed toward a target. Laser radiation reflected from the target passes back through window 18, impinges on parabolic mirror 24, and is focused to receiver 22. The transmitter and receiver are mounted along the central axis of enclosure 12 by aluminum beams 32 and 34. Electrical circuitry associated with the transmitter and receiver is mounted on circuit board 36 that is in turn mounted to support 38 mounted adjacent the rear surface of mirror 24. Connections between circuit board 36 and the transmitter and receiver are via lines 40 that extend along the inner surface of side wall 14.

Figure 2:
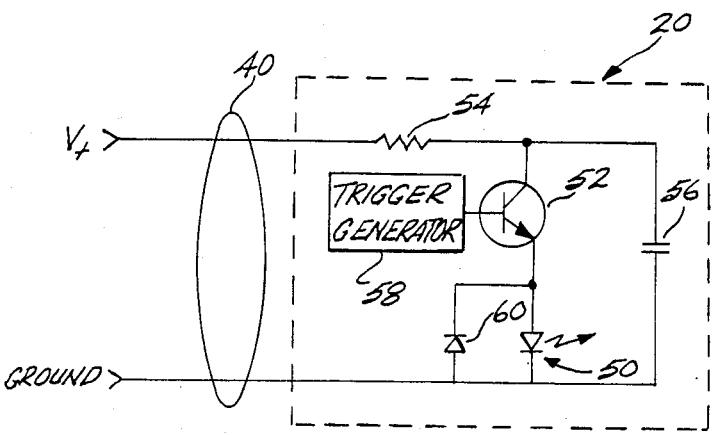
FIG. 2 is a circuit diagram of the transmitter.

Important characteristics of an optical radar system are the width and power of the light pulses that it produces. The pulse width determines the range resolution, e.g., a width of one nanosecond corresponds to a range resolution of 15 centimeters (6 inches). The intensity of the pulse determines the overall sensitivity and maximum range of the system. A suitable circuit for transmitter 20 is illustrated in FIG. 2. Transmitter 20 comprises laser diode 50, avalanche transistor 52, resistor 54, capacitor 56, trigger generator 58 and protective diode 60. Laser diode 50 is connected between the emitter of avalanche transistor 52 and ground. The collector of avalanche transistor 52 is connected to ground via capacitor 56 and to positive voltage supply $V_+$ through resistor 54. The base of avalanche transistor 52 is connected to trigger generator 58. The emitter of avalanche transistor 52 is connected to ground through laser diode 50 and protective diode 60.

In the absence of a trigger signal applied to the base of avalanche transistor 52, the transistor is nonconductive, and laser diode 50 emits no radiation. During this time, capacitor 56 charges to voltage level $V_+$. This voltage level is selected to be near the collector/emitter breakdown voltage of avalanche transistor 52. When a trigger signal from trigger generator 58 is applied to the base of the avalanche transistor, the collector/emitter junction will breakdown (avalanche) to produce a direct short between the collector and emitter of the avalanche transistor. Capacitor 56 then discharges through laser diode 50, resulting in a short intense pulse of light emitted by the laser diode. Protective diode 60 is high speed diode that conducts whenever the avalanche pulse goes negative, thereby protecting the laser diode against reverse voltages. When avalanche transistor 52 breaks down, resistor 54 protects the transistor by limiting current from the charging circuit through the transistor.

Figure 3:
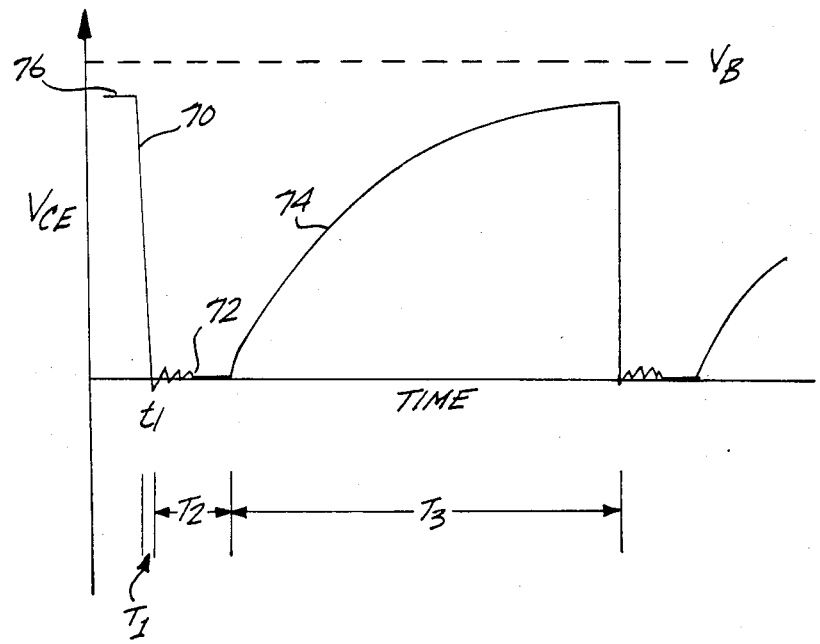
FIG. 3 is a graph showing the collector-to-emitter voltage of the avalanche transistor.

FIG. 3 illustrates the collector/emitter voltage ($V_{CE}$) of avalanche transistor 52 over time, assuming that trigger signals are periodically applied to the avalanche transistor base. The $V_{CE}$ waveform of FIG. 3 includes avalanche period 70, recovery period 72 and recharging period 74. At the end of each recharging period, the voltage level 76 is equal to $V_+$, which is just under collector/emitter breakdown voltage $V_B$. At time $t_1$, a trigger signal is applied to the base of the avalanche transistor, resulting in a breakdown that reduces $V_{CE}$ essentially to zero and causes a rapid discharge of capacitor 56 through the laser diode. The duration $T_1$ of breakdown period 70 is typically on the order of one nanosecond. The breakdown period is immediately followed by recovery period 72 that typically has a duration $T_2$ on the order of 100 to 1,000 nanoseconds. Resistor 54 limits the current through the laser diode during the recovery period. At the end of recovery period 72, the avalanche transistor becomes nonconductive and capacitor 56 again charges to voltage level $V_+$. The recharging of capacitor 56 is represented by recharging period 74 in FIG. 3, and the speed of recharging is determined by the values of capacitor 56 and resistor 54. Values for these components should be selected such that the capacitor has substantially recharged at the end of recharging period $T_3$, in preparation for the subsequent trigger signal. Typical values for resistor 54 and capacitor 56 and 50 kilohms and 500 picofarads, respectively. A typical value for $V_+$ is 150 volts.

The frequency of the trigger signals generated by trigger generator 58, i.e., the pulse repetition rate of transmitter 20, is limited by the ability of laser diode 50 to dissipate heat at the diode junction. If the pulse repetition rate is too high, then more heat builds up at the diode junction than can be dissipated between pulses, and the temperature becomes high enough to destroy the lasing action. For laser diodes that are currently commercially available, it has been found that the practical upper limit for the pulse repetition rate is about 10 kHz, even with pulses having widths as short as 1 nanosecond.

In an ideal circuit, when avalanche occurs, the power stored in capacitor 56 is immediately discharged through and dissipated in laser diode 50, resulting in a very brief and intense pulse of light. Two factors that limit the power and the minimum pulse width in an actual circuit are self-inductance effects and stray capacitive coupling to ground. The discharge current must pass through the leads of capacitor 56 to the collector of the avalanche transistor, then through the collector/emitter junction of the avalanche transistor, through the lead connecting the emitter of the avalanche transistor to the laser diode, and from there back to ground. At the very high current levels (e.g., 50 amps) required for many practical optical radar systems, skin depth effects are encountered wherein the current flow is mainly in the outer layers of a conductor. This current flow sets up fields within the conductor that oppose the current flow. For a high-frequency pulse, this self-inductance inpedance is considerable, and may typically by on the order of 0.5 ohms. The conducting leads will have the least self-inductance if they have the highest possible surface/volume ratio, i.e., if the leads are flat (wide and thin) like the conducting strip on a circuit board.

A second mechanism that can reduce the actual current flow through the laser diode is stray capacitive coupling to ground. A wide, flat conducting strip, selected to minimize self-inductance, generates comparably large values of capacitance. To the extent that there exists stray capacitance between the collector of avalanche transistor 52 and ground, the discharge pulse will charge such stray capacitance, instead of being dissipated in the laser diode. In this case, the charging and discharging of the stray capacitance will show up as positive and negative voltage spikes in the waveform of FIG. 3. Unfortunately, currently available laser diodes do not readily lend themselves to minimizing the combined effects of self-inductance and stray capacitance, thereby limiting the minimum pulse width and maximum power of such laser diodes.

Figure 4:
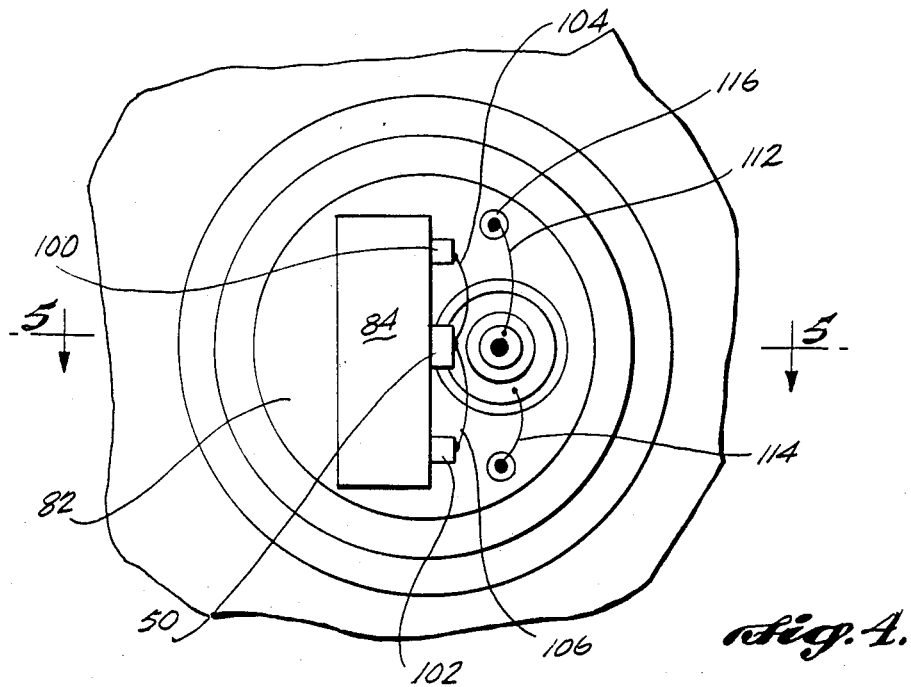
FIG. 4 is a top plan view of a preferred embodiment of the transmitter.
Figure 5:
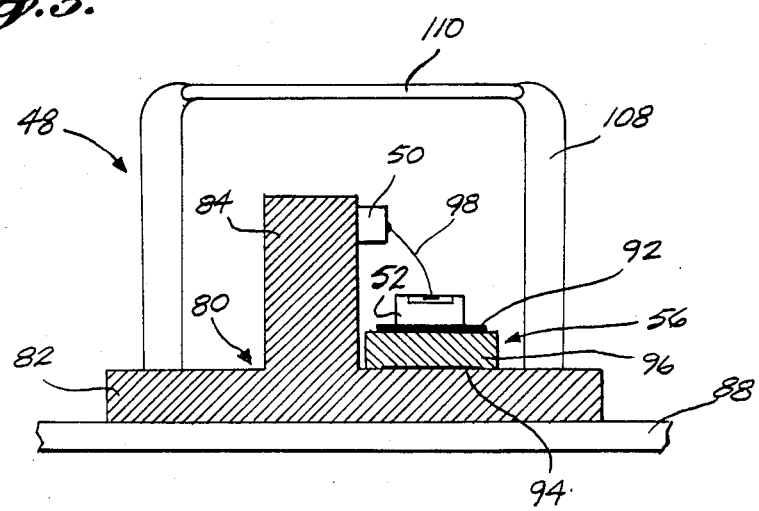
FIG. 5 is a cross-sectional view taken along the line 5—5 of FIG. 4.

One preferred technique for physically arranging the components of transmitter 20 to minimize the combination of self inductance and stray capacitive coupling is illustrated in FIGS. 4 and 5. The transmitter comprises heat sink 80 that includes base 82 and pedestal 84. Heat sink 80 is used to provide a system ground and to conduct away heat generated by operation of the transmitter. Base 82 is mounted to circuit board 88 that provides physical support for the transmitter. Laser diode 50 is mounted to pedestal 84 near the upper end thereof, the cathode of the laser diode being electrically connected to the pedestal. The laser diode is oriented so as to produce a light beam directed upward in FIG. 5. Capacitor 56 comprises dielectric 96 sandwiched between upper plate 92 and lower plate 94. Dielectric 96 may comprise a berylia platelet or other insulating material having a high thermal conductivity. Lower plate 94 is directly connected (e.g., soldered) to base 82, and thus to ground.

Avalanche transistor 52 has its collector mounted directly to upper plate 92 of capacitor 56, and its emitter connected to the anode of laser diode 50 through lead 98. Protective diodes 100 and 102 are mounted to pedestal 84 on either side of laser diode 50. Each protective diode has its anode connected to pedestal 84 (and therefore to ground), and has its cathode connected to the anode of laser diode 50 via leads 104 and 106, respectively. The transmitter is mounted within an enclosure formed by base 82, case 108 and window 110. Case 108 is mounted directly to the base, and may comprise a standard T05 mounting case or the like. Window 110 is mounted to the upper edge of case 108, and is fabricated from a material that is transparent to the light from the laser diode. Case 108 may be metallic, in which case the case is an extension of the ground formed by heat sink 80. Trigger signals are delivered to avalanche transistor 52 through lead 112 that extends through opening 116 in base 82 and a corresponding opening in circuit board 88. The junction between capacitor 56 and avalanche transistor 52 is connected through lead 114 and through externally mounted resistor 54 (not shown in FIGS. 4 or 5) to positive supply voltage $V_+$. Lead 114 extends through opening 118 in the base and a corresponding opening in the circuit board.

Figure 6:
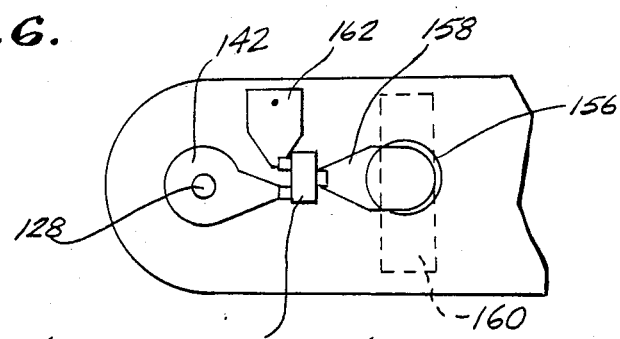
FIG. 6 is a bottom plan view of a second preferred embodiment of the transmitter.
Figure 7:
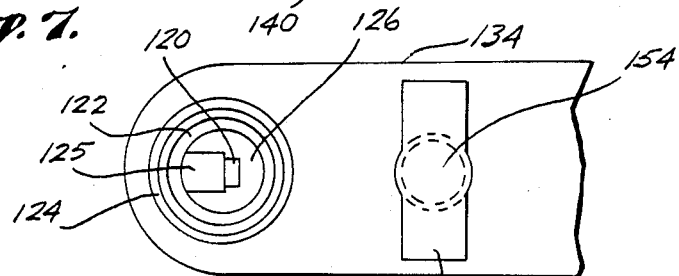
FIG. 7 is a top plan view of the embodiment of FIG. 6.
Figure 8:
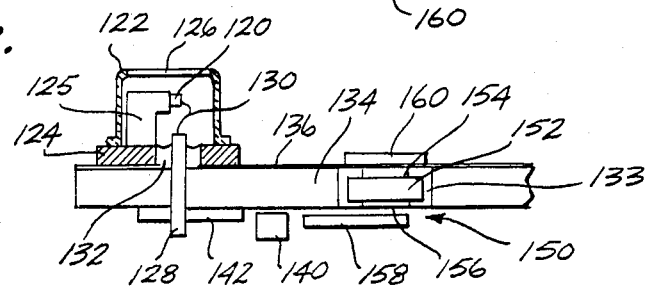
FIG. 8 is a cross-sectional view of the embodiment of FIG. 6.

In some applications, the available mounting and packaging for laser diodes may make the arrangement shown in FIGS. 4 and 5 impractical. Under these circumstances, a preferred arrangement is as shown in FIGS. 6–8. In FIGS. 6–8, laser diode 120 is mounted inside a conventional T-05 case 122 that includes base 124, pedestal 125 and window 126. The anode of laser diode 120 is connected to post 128 through lead 130. Post 128 extends through an opening in base 124 of the T-05 case, the passage of the post through the base being sealed by glass flux 132. The cathode of the laser diode is preferably connected to case 122. Laser diode 120, including its case, is mounted on circuit board 134 that includes ground plane 136. The case 122 is electrically connected to ground plane 136, thereby grounding the cathode of laser diode 120.

The arrangement of FIGS. 6–8 includes avalanche transistor 140 mounted on the underside of circuit board 134, and capacitor 150 that is mounted within a circular opening 133 within circuit board 134. Avalanche transistor 140 has the miniature SOT-23 configuration having very short leads. Capacitor 150 includes dielectric 152 sandwiched between upper plate 154 and lower plate 156. Lower plate 156 is connected to the collector of avalanche transistor 140 through conductor 158. The emitter of avalanche transistor 140 is connected to post 128 through conductor 142. Upper plate 154 is connected to ground plane 136 through ground strap 160. Finally, the base of avalanche transistor 140 is connected to conductor 162 that may in turn be connected to a suitable source of trigger signals.

Figure 9:
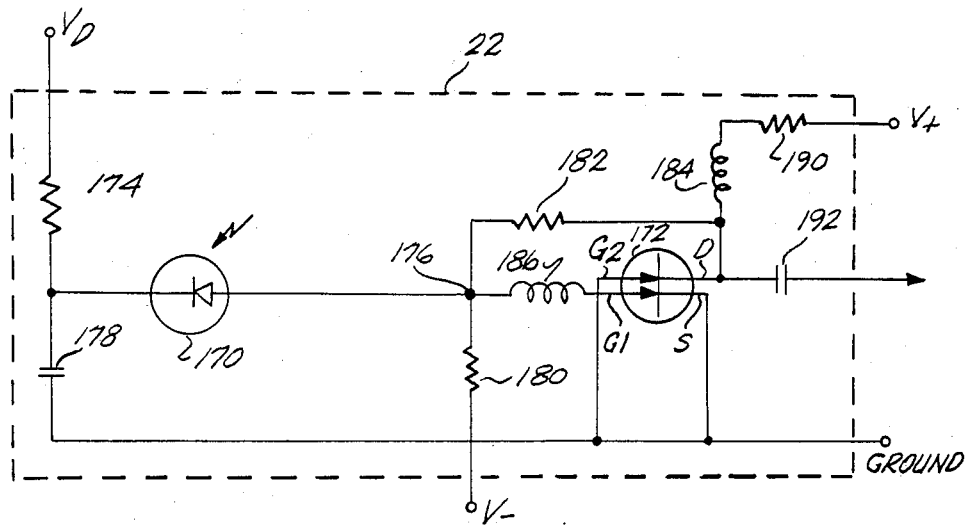
FIG. 9 is a circuit diagram of the receiver.

A preferred embodiment for receiver 22 of transceiver 10 is illustrated in FIG. 9. The receiver comprises photodiode 170 and dual gate gallium arsenide field effect transistor (GaAsFET) 172. GaAsFET 172 includes gates $G_1$ and $G_2$, drain D and source S. The output of the receiver is taken from drain D through capacitor 192. Gate $G_2$ and source S of GaAsFET 172 are connected to ground potential. The cathode of photodiode 170 is connected to ground through capacitor 178 and to supply voltage $V_D$ through resistor 174. The anode of photodiode 170, at node 176, is connected to gate $G_1$ of GaAsFET 172 by interface circuit that includes resistors 180 and 182 and coil 186. Resistor 180 is connected between node 176 and negative voltage supply $V_-$, resistor 182 is connected between node 176 and drain D, and coil 186 is connected between nodes 176 and gate $G_1$. Drain D is connected to a second positive voltage supply $V_+$ through coil 184 and resistor 190.

Resistors 180 and 182 are selected such that node 176 is maintained at a potential of approximately $-1.8$ to $-2.2$ volts. Voltage supply $V_D$ is selected to be a large positive voltage, typically much larger than voltage supply $V_+$. Photodiode 170 is therefore strongly reverse biased, the photocurrent through the photodiode being opposite to the conduction current. Without such bias, the response speed of the photodiode would be very slow, due to the high capacity at the diode junction. With a high bias voltage, the photodiode capacitance is greatly reduced, and the response speed is correspondingly increased.

A preferred component for GaAsFET 172 is the MRF 966 N channel GaAsFET available from Motorola. The MRF 966 GaAsFET has a finite input capacitance (between $G_1$ and $G_2$ and between $G_1$ and S) of about 0.45 picofarads. This capacitance would cause the amplification factor to decrease at the very high frequencies. For this reason, a "peaking coil" inductor 186 is inserted between node 176 and gate $G_1$, the size of inductor 186 being selected to peak the response function at around 800–900 MHz. The grounding of gate $G_2$ and source S results in a very high separation between the input and output stage, i.e. very little feedback and high signal-to-noise ratio. The interface comprising resistors 180 and 182 provides a relatively high input impedance of about 1,000 ohms. This impedance provides a good match between the high impedance of photodiode 170 and the impedance of GaAsFET 172.

Figure 10:
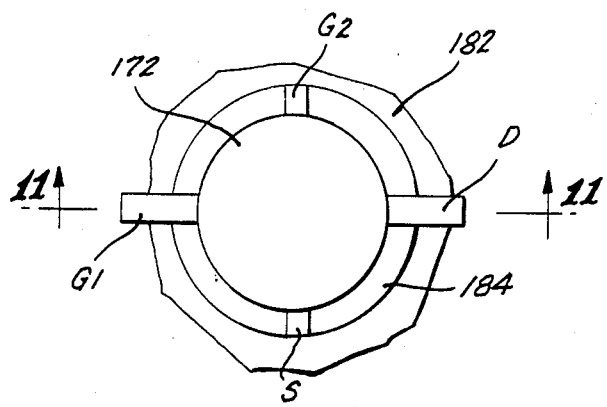
FIG. 10 is a top plan view of a preferred embodiment of the gallium arsenide field effect transistor.
Figure 11:
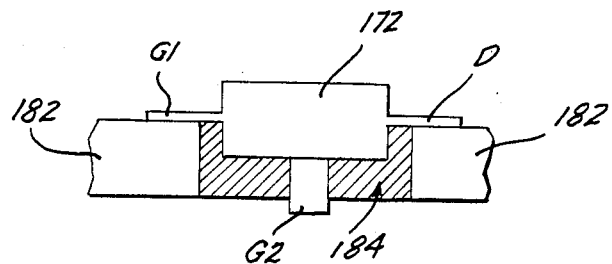
FIG. 11 is a cross-sectional view taken along the line 11—11 of FIG. 10.

When the current through photodiode 170 goes up in response to the receipt of illumination, the voltage at gate $G_1$ goes up, and the voltage at drain D goes down. The latter voltage is fed back via resistor 182 and maintains the voltage at gate $G_1$ nearly constant at about $-2$ volts, producing an improved signal-to-noise ratio. A preferred mounting arrangement for GaAsFET 172 is illustrated in FIGS. 10 and 11. The GaAsFET is positioned such that it is nearly flush with circuit board 182, and is partially positioned within circular opening 184 in the circuit board. Terminals $G_1$ and D are both soldered to the upper surface of the circuit board, and terminals $G_2$ and S are bent down and soldered to the bottom (ground plane) of the circuit board.

Figure 12:
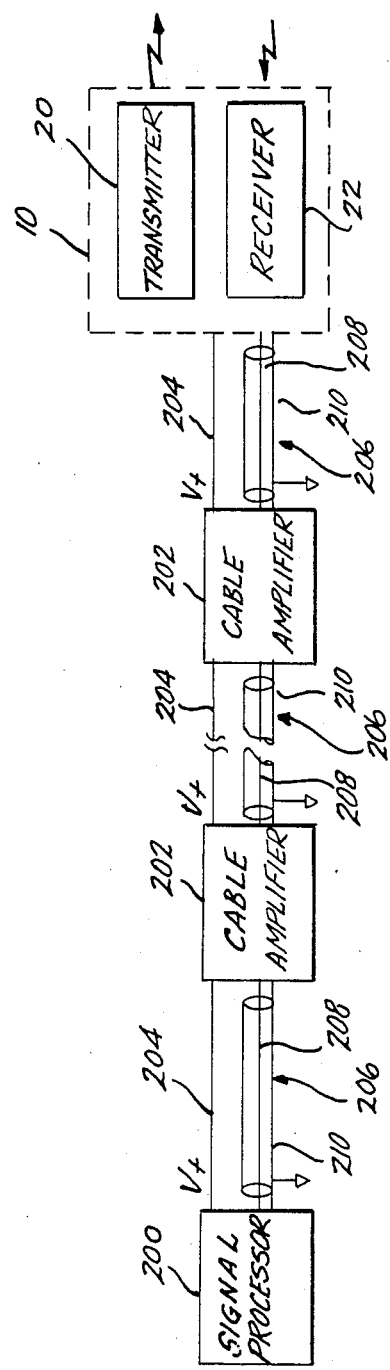
FIG. 12 is a block diagram of the optical radar system.

FIG. 12 sets forth a schematic diagram of an overall optical radar system according to the present invention. The optical radar system includes signal processor 200, one or more cable amplifiers 202, and transceiver 10 that includes transmitter 20 and receiver 22. The signal processor, cable amplifiers and transceiver are interconnected by power ($V_+$) lines 204 and coaxial cables 206. Each coaxial cable includes signal line 208 and shield 210. Power lines 204 function to transmit electrical power ($V_+$) from signal processor 200 to the cable amplifiers and to the transmitter/receiver. Shields 210 operate to shield signal lines 208, as well as to provide common ground connections between the signal processor, cable amplifiers and transceiver. Transmitter 20 periodically produces a short intense pulse of optical radiation at a rate controlled by trigger generator 58 (FIG. 2). The pulses are reflected from a target, and the reflections are received by receiver 22. Receiver 22 (FIG. 9) converts the optical signal into an electrical signal, and transmits the electrical signal to signal processor 200 via signal lines 208 and cable amplifiers 202. The signal processor analyzes the return signal to determine the target range and/or other target characteristics.

Figure 13:
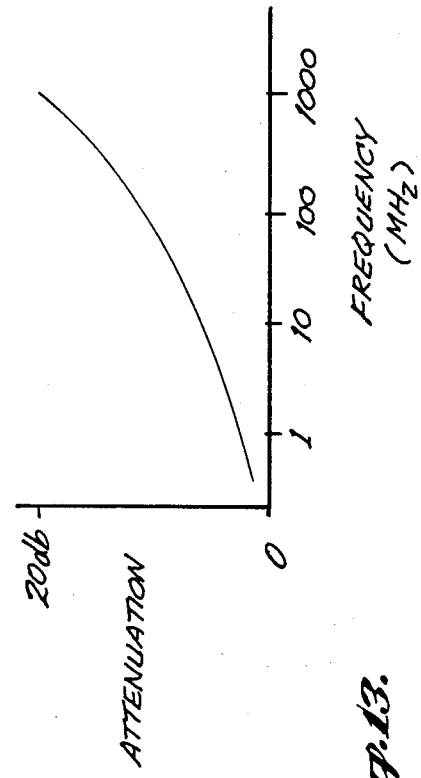
FIG. 13 is a graph showing attenuation versus frequency for a coaxial cable.

It is contemplated that the optical radar system of the present invention will frequently be configured with transceiver 10 positioned at a remote site at which a range or other measurement is to made, and it will therefore be necessary to transmit the return signal over a considerable distance to a centrally located signal processor. Although subsystems for sampling and/or analyzing the return signals could be located at each remote site, it is preferable to locate such systems centrally and to transmit the entire return signal, essentially without change, from the transceiver to the central signal processor. The function of cable amplifiers 202 can be illustrated with reference to FIG. 13. FIG. 13 shows the attenuation of a 100 foot length of coaxial cable (type RG 58) as a function of frequency in the range 1–1000 MHz. As indicated, the attenuation continuously increases as the frequency increases, and reaches a value of approximately 20 db at 1000 MHz. The function of the cable amplifier is to compensate for this attenuation, such that the cable/cable amplifier transsmision system has essentially zero attenuation up to 1000 MHz.

Figure 14:
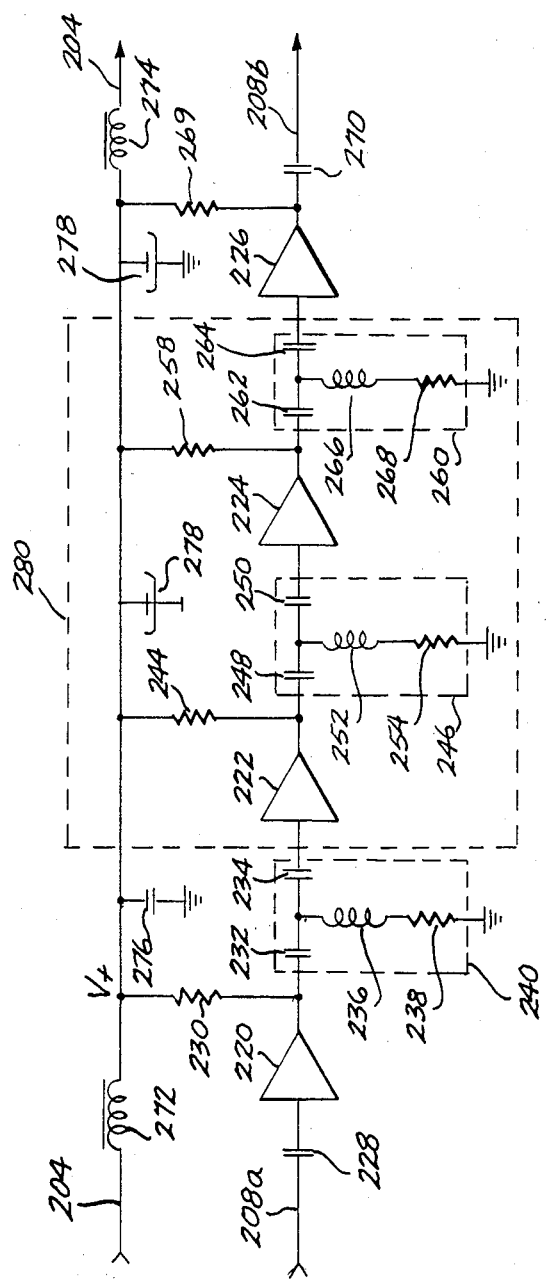
FIG. 14 is a circuit diagram of a preferred embodiment of the cable amplifier.

A preferred embodiment of cable amplifier 202 is set forth in FIG. 14. The cable amplifier includes amplifiers 220, 222, 224 and 226. Each amplifier is connected (not shown) between the $V_+$ supply on power line 204 and ground potential provided by coaxial cable shield 210. The signal on signal line 208a is input to amplifier 220 via capacitor 228. The output of amplifier 220 is connected to pull-up resistor 230, and is input into highpass T filter 240 comprising capacitors 232 and 234, inductor 236 and resistor 238. The output of highpass filter 240 is input to amplifier 222. The output of amplifier 222 is connected to pull-up resistor 244, and is input into highpass T filter 246 that comprises capacitors 248 and 250, inductor 252 and resistor 254. The output of highpass filter 246 is input to amplifier 224. The output of amplifier 224 is connected to pull-up resistor 258 and is input into highpass T filter 260 that comprises capacitors 262 and 264, inductor 266 and resistor 268. The output of highpass filter 260 is input to amplifier 226. The output of amplifier 226 is connected to pull-up resistor 269, and is connected to signal line 208b via capacitor 270. For some applications, inductors 236, 252 and 266 may be omitted from the respective highpass filters. The cable amplifier also comprises inductors 272 and 274 connected in line 204, and capacitors 276 and 278 connecting line 204 to ground.

The function of cable amplifier 202 is to compensate for the attenuation illustrated by FIG. 13. Suitable devices for amplifiers 220, 222, 224, and 226 are the wideband MWA amplifiers available from Motorola. Such amplifiers are integrated modules with wideband frequency responses, and with built-in compensation networks to match the input and output to 50 ohm coaxial cable. The MWA 100 series is designed for applications from DC up to 400 MHz, the MWA 200 series operates up to 600 MHz, and the MWA 300 series operates up to 1 GHz. There should be an even number of amplifiers in cable amplifier 202, to avoid inverting the input signal. Circuit 280 of the cable amplifier shown in FIG. 14 may therefore be removed, depending on the particular application. Highpass filters 240, 246 and 260 are adjusted such that the frequency response of amplifiers 220, 222, 224 and 226, combined with the responses of the highpass filters and the attenuation of the coaxial cable, results in an essentially flat frequency response up to 1000 MHz for the return signal from transceiver 10 to signal processor 200. Inductors 272 and 274 operate to filter high frequency components out of the $V_+$ line. Capacitors 276 and 278 perform a similar function. Capacitor 276 preferably has a value of around 150 pF to filter out very high frequency components, and capacitor 278 is an electrolytic capacitor to filter out low frequency noise.

Figure 15:
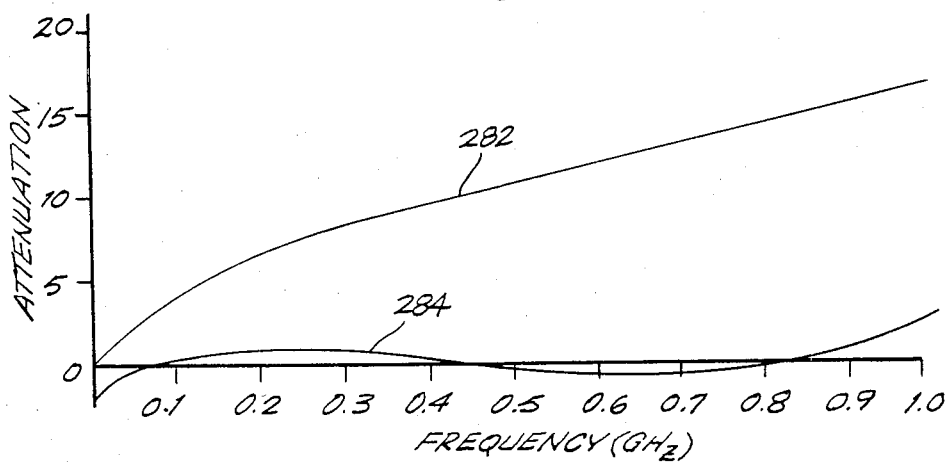
FIG. 15 is a graph showing modification of the coaxial cable attenuation characteristics by means of the cable amplifier; and, FIG. 16 is a graph showing the return signal.

A typical result achieved with the cable amplifier of the present invention is illustrated in FIG. 15. Curve 282 represents the attenuation of 100 feet of RG 58A/U coaxial cable as a function of frequency in the range DC-1 GHz. Curve 284 shows the results with a two stage cable amplifier comprising two MWA 310 amplifiers and an intervening highpass filter having a value of 4.7 pF for each capacitor and a resistor value of 100 Ohms.

Figure 16:
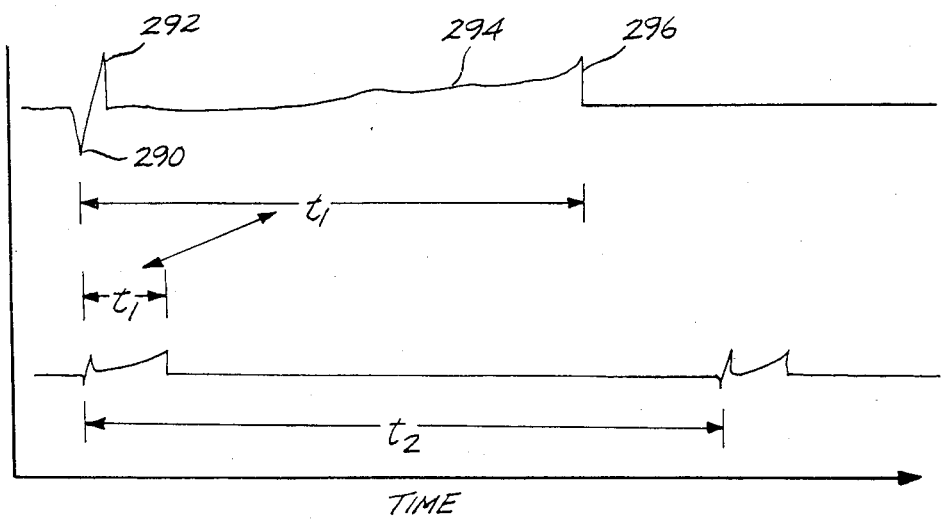

FIG. 16 illustrates a typical signal transmitted from transceiver 10 to signal processor 200. Referring initially to the upper curve in FIG. 16, negative going pulse 290 represents an artificially-introduced timing signal that is derived directly from the output of trigger generator 58 (FIG. 2). Positive pulse 292 is a return signal due to reflection and scattering of light from window 18 of transceiver 10. Since even with a very clear and clean window, about 10% of the light from the transmitter will be scattered at the window, in many cases it will not be necessary to introduce timing pulse 290. Variable signal portion 294 represents light scattering off atmospheric dust and the like, while the pulse at 296 is caused by light reflection from the target. It is assumed in FIG. 16 that the target is solid, and therefore no signals are received subsequent to pulse 296. For a radar system having a range, for example, of up to 300 meters, the total time $t_1$ occupied by the sequence from timing pulse 290 to return pulse 296 is on the order of 2 microseconds. As described above, a practical upper limit for the pulse repetition rate for presently available laser diodes is about 10 KHz. At such a repetition rate, the time $t_2$ between successive transmitter pulses is on the order of 100 microseconds. The signal of interest therefore occupies 2% of the time band, and the time outside the region of interest can be used to transmit additional encoding information or the returns from multiple lasers that are operated in parallel with one another.

Processing of the signal illustrated in FIG. 16 may employ any conventional range tracking techniques, and will vary with the particular application of the radar system. For example, a simple tracking technique would involve scanning the range of interest using a gate controlled by a ramp generator, the ramp starting upon receipt of pulse 290 or 292. The ramp signal is input to a comparator circuit, the other comparator input being a slowly varying scanning voltage. When the ramp exceeds the scanning voltage, the return pulse is sampled by a suitable sample and hold circuit. Such an arrangement would be simple to implement but would provide a comparatively slow data speed. For example, at 4,000 pulses/second and a resolution of 1 in 2,000 over 2 microseconds, a ten-second scan would average over 20 pulses at each time increment. The signal-to-noise ratio could be enhanced by looking only at a small portion of the 2 microsecond signal, i.e., by scanning across the whole pulse only occasionally, and then locking in on the peak of the return pulse. The lock-in could be accomplished using a tracking gate comprising two gates a distance of 2 nanoseconds apart, which gates track the signal peak to maintain equal signal amplitude at the two gates. If the signal amplitudes differ, the gates are shifted up or down the ramp, depending on the polarity of the difference reading. With signal averaging it is possible that this tracking technique can provide a further increase in the resolution by a factor of ten. If even greater accuracy is required, the tracking system can use a larger number of gates, triggering them at consecutive time intervals. This gate array can then be shifted up or down the ramp to scan a particular region of interest.

While the preferred embodiments of the invention have been illustrated and described, it is to be understood that variations will be apparent to those skilled in the art. Accordingly, the invention is not to be limited to the specific embodiments illustrated and described, and the true scope and spirit of the invention are to be determined by reference to the following claims.

We claim:

1. A transmitter for an optical radar system, comprising:
    a metallic heat sink;
    a laser diode mounted to the heat sink in direct heat transfer thermal relationship thereto, the laser diode having first and second terminals and having its first terminal electrically connected to the heat sink;
    a capacitor positioned adjacent the heat sink, the capacitor comprising a first plate having direct mechanical and electrical connection to the heat sink and a second plate spaced from the first plate;
    an avalanche transistor having its collector connected to the second plate and its emitter connected to the second terminal of the laser diode;
    means for providing a trigger signal to the base of the avalanche transistor; and
    means for charging the second plate, the direct mechanical and electrical connection of the capacitor to the heat sink minimizing self-inductive impedance and stray capacitance when the capacitor discharges through the laser diode.

2. The transmitter of claim 1, wherein the avalanche transistor is mounted directly to the second plate.

3. The transmitter of claim 1, wherein the means for providing a trigger signal and means for charging the second plate each comprise conductor means extending through the heat sink adjacent the capacitor.

4. The transmitter of claim 1, wherein the laser diode is mounted directly to the heat sink adjacent the avalanche transistor.

5. The transmitter of claim 1, wherein the heat sink comprises a base and a pedestal upstanding from the base, the laser diode being mounted to the pedestal and having its first terminal electrically connected to the pedestal, the capacitor being positioned mounted to the base adjacent to the pedestal.

6. The transmitter of claim 5, wherein the laser diode includes an output axis along which the laser diode emits light, and wherein the laser diode is mounted to the pedestal such that the output axis is directed away from the base.

7. The transmitter of claim 1, further comprising a case enclosing the laser diode, avalanche transistor and capacitor, the case comprising a window through which the laser diode emits light along the output axis.

8. The transmitter of claim 5, wherein the capacitor and avalanche transistor are positioned immediately adjacent the pedestal, and wherein the laser diode is mounted to a side of the pedestal facing the capacitor and avalanche transistor.

9. A transmitter for an optical radar system, comprising:
    a support having a pair of opposed surfaces;
    a laser diode comprising a case and first and second terminals, one of said terminals being connected to a conductor that extends from the case, the laser diode being mounted to the first surface of the support with the conductor extending through the support to the second surface;
    a capacitor comprising first and second plates, the capacitor being mounted substantially within a cut-away portion of the support to minimize self-inductive impedance and stray capacitance when the capacitor discharges;
    ground means adjacent one of said surfaces connecting the first terminal of the laser diode to the first plate; and
    an avalanche transistor mounted adjacent the opposite surface of the support from the ground means, the avalanche transistor being electrically connected between the second plate of the capacitor and the second terminal of the laser diode.

10. The transmitter of claim 9, wherein the plates of the capacitor are substantially coplanar with the respective surfaces of the support.

* * * * *